(12) United States Patent
Benedetti

(10) Patent No.: US 9,045,293 B2
(45) Date of Patent: Jun. 2, 2015

(54) SYSTEM FOR DRY-FILLING BINS WITH VEGETABLE PRODUCTS

(75) Inventor: Angelo Benedetti, Lugo (IT)

(73) Assignee: Unitec S.P.A., Lugo, Ravenna (IT)

( * ) Notice: Subject to any disclaimer, the term of this patent is extended or adjusted under 35 U.S.C. 154(b) by 413 days.

(21) Appl. No.: 13/513,700

(22) PCT Filed: Nov. 18, 2010

(86) PCT No.: PCT/EP2010/067726
§ 371 (c)(1),
(2), (4) Date: Jun. 4, 2012

(87) PCT Pub. No.: WO2011/088917
PCT Pub. Date: Jul. 28, 2011

(65) Prior Publication Data
US 2012/0272625 A1  Nov. 1, 2012

(30) Foreign Application Priority Data
Jan. 20, 2010  (IT) .............................. PN2010A0003

(51) Int. Cl.
| B65B 25/04 | (2006.01) |
| B65B 57/10 | (2006.01) |
| B65G 69/04 | (2006.01) |
(Continued)

(52) U.S. Cl.
CPC ............ B65G 69/0458 (2013.01); B65B 57/10 (2013.01); B65B 5/101 (2013.01); B65B 25/046 (2013.01); B65B 39/003 (2013.01)

(58) Field of Classification Search
CPC .... B65B 25/046; B65B 25/04; B65B 37/005; B65B 39/007; B65B 57/10; B65B 5/101; B65B 5/108; B65B 39/12; B65B 39/003; B65B 39/00; B65G 69/0458; B65G 2201/0211
USPC ........................ 53/493, 494, 244, 248; 193/7
IPC ............................................ B65B 25/04, 39/12
See application file for complete search history.

(56) References Cited

U.S. PATENT DOCUMENTS

| 3,000,162 A | * | 9/1961 | Carlsen et al. ................... 53/248 |
| 3,601,949 A | * | 8/1971 | Slusher ............................ 53/248 |

(Continued)

FOREIGN PATENT DOCUMENTS

| EP | 858949 A1 | * | 8/1998 | ............ B65B 25/046 |
| EP | 1740465 |  | 1/2007 |  |

(Continued)

*Primary Examiner* — Stephen F Gerrity
(74) *Attorney, Agent, or Firm* — Davis & Bujold, P.L.L.C.; Michael J. Bujold

(57) ABSTRACT

A produce filling apparatus includes a bin filling head and a disk arranged under the head. The disk is made up of two plates, each having one or more openings. Plural sensors beneath the disk detect the presence of produce at a pre-defined vertical distance from the lower plate. A control unit detects the instantaneous position of both overlying rotating plates and determines the speed of rotation of each of the rotating plates in a manner that depends on a pre-coded external signal generated by the sensors and by the instantaneous positions of the rotating plates. The control unit processes the information received and controls the respective angular speed of the plates so that the respective openings are vertically aligned, so as to distribute the produce to those bins in which an absence of underlying produce is sensed.

11 Claims, 10 Drawing Sheets

(51) Int. Cl.
   *B65B 5/10*      (2006.01)
   *B65B 39/00*     (2006.01)

(56) References Cited

U.S. PATENT DOCUMENTS

| | | | |
|---|---|---|---|
| 3,633,732 A * | 1/1972 | Russell et al. | 53/500 |
| 4,194,343 A * | 3/1980 | Myers et al. | 53/493 |
| 4,446,670 A * | 5/1984 | Compagnoni | 53/244 |
| 2003/0000968 A1* | 1/2003 | Van Wijngaarden et al. | 222/196 |
| 2008/0066429 A1* | 3/2008 | De Greef | 53/244 |
| 2012/0005986 A1* | 1/2012 | Grentz et al. | 53/391 |

FOREIGN PATENT DOCUMENTS

| | | | | |
|---|---|---|---|---|
| FR | 2753683 | | 3/1998 | |
| FR | 2852306 A1 * | | 9/2004 | ............ B65B 25/046 |
| GB | 1115683 | | 5/1968 | |
| SU | 428988 A2 * | | 10/1974 | .............. B65B 25/04 |
| SU | 765125 A1 * | | 9/1980 | .............. B65B 25/04 |
| WO | WO 0012415 A1 * | | 3/2000 | ............ B65B 25/046 |

* cited by examiner

SYSTEM FOR DRY-FILLING BINS WITH VEGETABLE PRODUCTS

The present invention refers to an improved system for automatically filling containers, or "bins", with agricultural produce, such as typically apples, pears, etc., but also legumes.

BACKGROUND OF THE INVENTION

In general, bin-filling systems consist mainly of a feeding and transfer apron or belt conveyor (moving on a substantially horizontal plane), on which are laid in a sequential manner the agricultural products to be placed into the bins, and of an actual bin-filling device, or "head", as it will be referred to hereinafter, which is made up of a vertical section whose top end is loaded with the produce successively brought by said conveyor, and the other end, located at a lower height, is inserted into the bin to distribute the produce therein.

In order to adjust the vertical distance of said lower end from the level of the produce already placed into the bins so as not to have an excessive distance between said lower end and the level of the produce in the bin—which would damage the quality of the produce dropping from an excessive height—this head, and therefore the respective lower end, is made mobile in the vertical direction inside the container being filled.

Said head is principally made up of:

a first device suitable to engage each farm product and to transfer it with a continuous motion downward, where said product is placed;

a second device that receives the produce from said first device and lets it fall inside the bin, spreading it out substantially on most of the higher surface of the produce already loaded into the bin.

Said first device is normally made up of a special continuous conveyor equipped with individual receptacles formed by relative "finger-like" elements that externally grip the produce and set it down piece by piece and with a continuous movement from said feeding conveyor into a rotary cradle, into which they are automatically released by gravity when they reach the lower position.

Said second device is in fact said rotary cradle, placed inside the bin but in a position slightly higher than the level of the produce already placed into the bin; said rotary cradle is provided with devices suitable to carry the produce not to a fixed position, but to continually variable positions above the greater part of the bin, and to allow the produce to fall therein so that it is ideally distributed over the whole upper surface of the produce already loaded.

The above description illustrates in a complete, although synthetic manner, the fundamental structure and the operation of a basic type of system, normally used to dry-load the produce inside a bin.

It is therefore a system well known in the art and that has also been disclosed in patents:

EP 1 740 465 B1 (to DE GREEF'S)

FR 2 753 683 B1 (to XEDA INTERNATIONAL SA).

Thus, for the sake of brevity and for greater clarity, what is not explicitly described and claimed below in the present patent should be considered as described and disclosed in the cited patents.

The solutions claimed in said documents bear witness to the common concern among the operators in the field to handle agricultural produce with great care to avoid damaging it; in fact, some agricultural products are extremely delicate and sensitive to bumps, and therefore their handling, packaging, transportation, etc., must be carried out so as to avoid as much as possible any risk or possibility of impacts or rubbing.

Accordingly, the above patent FR 2 753 683 B1 discloses a single powered belt 14, both for the horizontal conveyor and the vertical section, as described in the relative Specification on page 11, starting on line 25, for the purpose of avoiding damage to the produce that would occur if the produce were transferred from a horizontal conveyor to a vertical conveyor.

The above-mentioned Patent EP 1 740 465 B1 expresses the same concern about avoiding damaging the produce: see in fact col. 1, lines 15-24.

With the objective of avoiding this risk, said patent introduces the use of a brush-like element (11, 15, 16) suitable to engage softly and piece by piece each type of produce, increasing effectively the produce engagement surface and thus decreasing the average pressure applied on the produce and, as a logical consequence, the possibility of damaging it.

However, the solutions described, although valid with regard to handling agricultural products, still do not resolve a further problem and drawback: in fact, during the process of filling the bins with a filling head of the type previously described, the following situation occurs: due to the fact that the produce that feeds said filling head comes generally from grading systems, the head is fed in an absolutely random manner and with a rate that is normally well below its filling capacity. In fact, the objective is to avoid that in extreme—but still possible—conditions said head could be supplied with a flow rate of produce greater than the handling and filling capacity of the same head, as in this case the produce would simply spill out of the head.

Thus, the filling capacity of the head is kept considerably greater than the average flow of incoming produce.

This explains how the produce processed by the head arrives to it in an absolutely random manner.

Thus it is entirely possible, and it is often the case, that in certain intervals of time there is no produce being fed toward a given bin. In this case however, the filling head continues to run, because it has not been notified in any way of the absence of produce, and this leads to the consequence that the flaps used by said head continue to rub on the last loaded produce (which thus lies on top of the mass of produce already laid in the bin).

Since in this situation the head continues to turn without discharging any new produce, the result is that said flaps continue to rub always on the same produce, and since as is well known this is a delicate product, the final effect is that it suffers a sort of "shaving" and is thus damaged, due to the prolonged rubbing effect of said flaps.

This serious problem goes along with another drawback; that is, the continuous operation of the rotating filling head, and of the connected devices, causes a clear waste of energy, and therefore a cost due to the limited capacity of the system to adjust itself on the basis of the effective workload.

Turning again to the produce, since it is immediately processed, that is, sent to the bin, there is the occurrence of the phenomenon well known in the field whereby the produce tends to spread itself in the bin with a random distribution, which results in an irregular distribution.

In fact, with reference to FIG. 1, a normal bin of parallelepiped shape is shown partly filled with agricultural produce by a filling head of known type.

It can be seen that the top surface 1 of the mass of produce 2 already charged into the bin shows a completely irregular distribution, as is caused in fact by the random arrival and distribution of each product, and is not uniform and level as would be natural to imagine.

Basically, it can be seen that said upper surface 1 is arranged with uneven sunken zones, or depressions 3, alternating with raised zones 4.

This phenomenon is fully evident in FIG. 2, which shows the arrangement on a plane of the bin cross section and cuts through the mass of produce already placed in the bin, and therefore intercepts the upper profile of the distribution of produce in the bin; FIG. 2 in particular clearly shows such upper profile.

The phenomenon described above generates in turn two types of drawbacks:

A) the first and greatest shortcoming is caused by the fact that, when well-known sensing means sense that the height of the products inside the bin being filled reaches a certain predefined level, that bin is considered to be completely filled, and thus it is carried away and replaced with an empty one. However, exactly because of its irregular filling, normally that bin could still receive an additional quantity of produce, if only it were uniformly distributed over the whole loading area.

This fact generates an evident and well-known diseconomy, as it requires using, and thus handling, washing, storing, etc., a needlessly large number of bins, as much as 30% larger than the number of bins that would be sufficient for a given quantity of produce.

B) the second drawback is naturally caused by the fact that, if and when the individual product is released by the filling head on a typical depression 3 in the previously loaded produce, the falling distance "d" (FIG. 2) can be unacceptable to maintain the quality of both the produce being released and the underlying produce, as this would thwart the use of the filling head, whose function is in fact to handle the delicate produce with great care.

SUMMARY OF THE INVENTION

It would therefore be desirable, and it is the main objective of the present invention, to be able to realize a type of automatic system for filling containers/bins with fruit and vegetable produce, that uses an improved rotating filling head with the relative control and drive means, and a relative charging method suitable to substantially limit the above drawbacks A) and B).

This objective is achieved by a system and a related process as described below.

BRIEF DESCRIPTION OF THE DRAWINGS

Some characteristics and advantages of the invention will become evident from the description which follows, given by way of non-limiting example, with reference to the enclosed drawings, wherein.

DESCRIPTION OF THE PREFERRED EMBODIMENT

Figure 1:
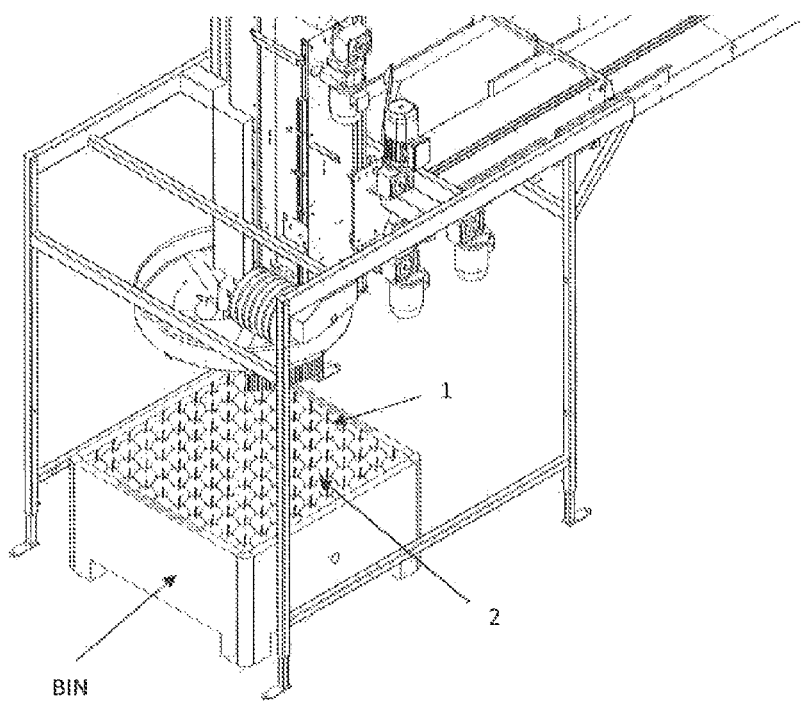
FIG. 1 shows a normal bin of parallelepiped shape partly filled with agricultural produce by a filling head of known type.
Figure 2:
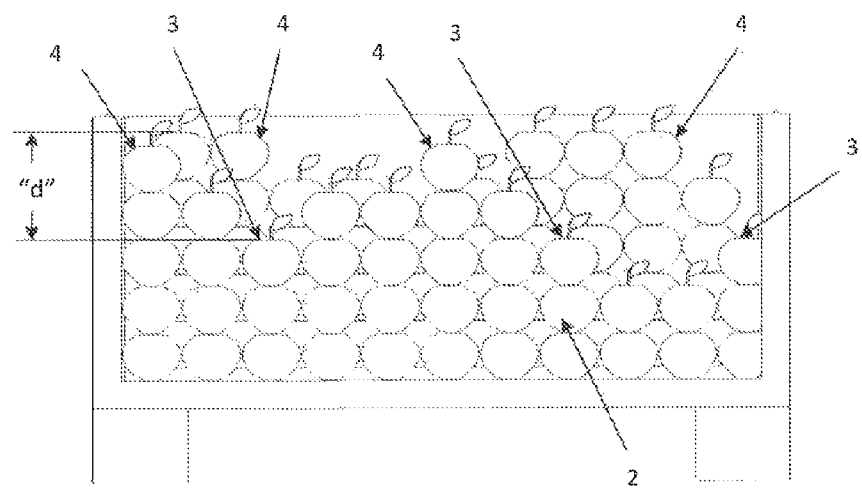
FIG. 2 shows the arrangement on a plane of the bin cross section and cuts through the mass of produce already placed in the bin of known type.
Figure 3:
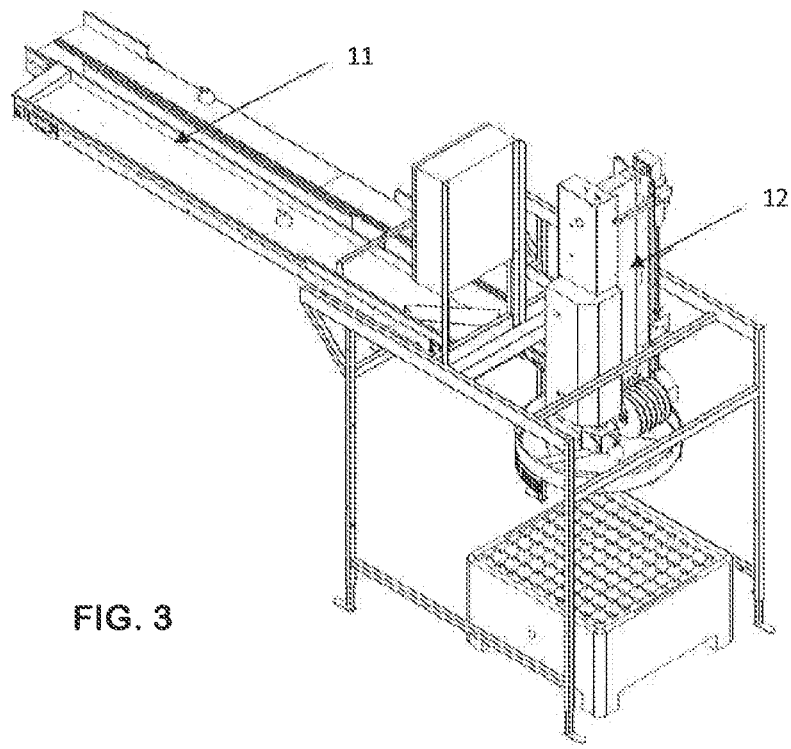
FIG. 3 shows a general perspective view of a system according to the known art, but that can embody the invention, which is not specifically shown here.

With reference to FIG. 3, an apparatus for filling containers open at the top with products in bulk, preferably vegetable articles, and made according to the known art includes:

a product feeding device, preferably realized by means of a first continuous and preferably sliding conveyor 11;

a bin filling head, disposed directly above them, which includes:

a means 12, or "head" as it will be referred to hereafter, for lowering the individual products, preferably of belt type or a second conveyor suitable to engage the produce carried by said first conveyor 11, to move in a closed and substantially vertical loop, and provided with gripping or finger-like elements 13 suitable to engage said vegetable products in its upper portion and to carry them downward in a continuous vertical motion down to its lower portion, and to release them by gravity;

a disk disposed under said lowering means 12, and consisting of two circular, coaxial plates 14, 15 superimposed on each other, having substantially the same diameter and being substantially contiguous to each other, rotating in the same direction, each of them provided respectively with one or more openings 41, 42, 43, . . . , and 51, 52, 53, . . . , arranged in a preferably radial manner in the respective rotating plate;

a plurality of sensors 21, 22, 23, . . . , arranged in a position underlying said disk, and suitable to detect the presence of said products at a predefined vertical distance from the lower plate 4.

According to the invention, there are provided:

means for driving the rotation of said rotating plates 14 and 15 individually, drive and control means, or control unit 60 (FIGS. 10, 10A) connected to said drive means and also suitable to sense or calculate the instantaneous position of each of said plates; it being understood that this instantaneous position refers to the angle between a fixed reference point, for example placed on the machine, and a fixed reference point on the plate, and rotating with the same plate.

It is also obvious that said reference points are not necessarily material references, but are preferably references in the programs and in the data stored and installed in said drive and control means. Moreover, said drive and control means are also suitable to determine the instantaneous speed of each of said rotating plates, on the basis of additional signals and processing operations that will be explained hereinbelow.

Figure 10:
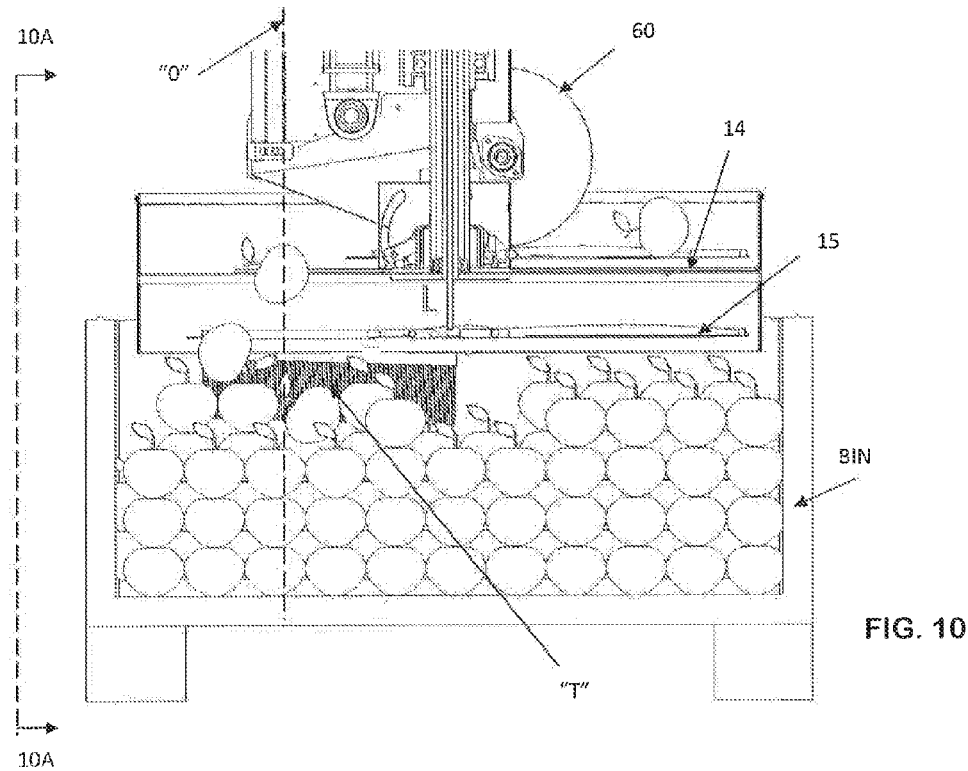
FIG. 10 shows a symbolic and schematic view of the two components of FIG. 9, along the relative cross-sectional plane A-A.
Figure 10A:
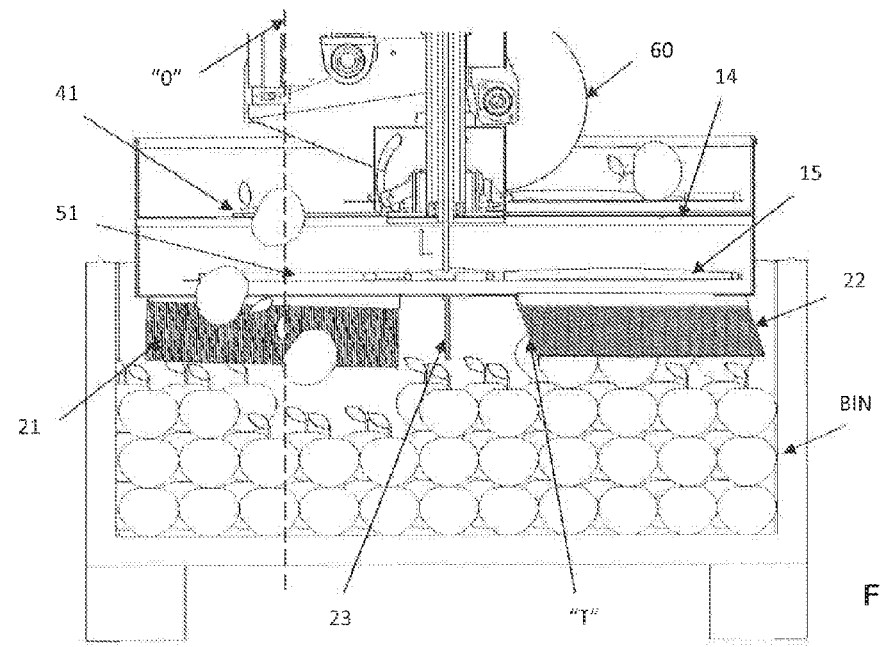
FIG. 10A shows a symbolic and schematic view of the two components of FIG. 9, and of the sensor, along the cross-sectional plane B-B of FIG. 10.

With reference to FIGS. 10 and 10A, below the rotating plate 15 there is at least one rotating sensor, not necessarily fastened to said plate but normally and for greater simplicity connected underneath the same, so as to rotate at the same speed.

Said rotating sensor is preferably made up of one or more flexible comb-like elements 21, 22, 23, . . ., connected at the top and oriented downward, that actuate respective microswitches, not shown. The angle of inclination and the length of said flexible comb-like element 21, and the geometrical and mechanical arrangement of the relative microswitch with respect to said comb 21 are such that, as shown in FIGS. 10 and 10A, when in its rotation said comb meets an obstacle (point "T"), like an item of produce or fruit, it is momentarily forced to lift, naturally only for the time necessary to "leap" over said obstacle, after which said comb returns to its normal, vertical position. With an appropriate combination of the preselected geometry and dimensions of the elements involved, at a suitable distance of said obstacle "T" from the lower plate 15 said comb brushes against said microswitch and actuates it.

It is pointed out here that naturally the elements described above are interconnected so that the microswitch is actuated only when the comb is inclined beyond a predefined angle or for a predetermined time, and this circumstance, combined with the length of the comb 21 naturally defines the distance "d" of the highest point in the mass of produce in the bin which actuates said microswitch.

Conversely, and logically, it will be evident that it is first possible to define said distance "d", and then arrange said elements so that said microswitch is immediately actuated when the comb meets and climbs over an obstacle whose vertical distance from said lower rotating plate 15 is less than or the same as said distance "d".

And thus, in short, said assembly will provide a series of signals that effectively represent a map of the profile of the distribution in height of those products under said rotating plate 15 whose distance from said plate is less than said predetermined distance "d".

During a normal bin filling process, there is easily and frequently the drawback explained above in A) and B), that is, the at times very irregular distribution in height of the products inside the bin.

To overcome this problem, the fundamental teaching of the present invention consists of releasing the produce inside the bin only in those areas, "passed over" by said openings, in which the signals generated by said sensor, that is, the comb and microprocessor, indicate the absence of products arranged nearer than that distance "d". This condition naturally indicates that in those areas the profile of the products is still fairly low, and thus this initiates a filling procedure that makes it possible and ensures that new produce is released on those same areas, and not on other areas, with the evident purpose of ideally "levelling" the top profile of the load of produce.

Here it will naturally be objected that, when it is signalled that all the profile explored indicates a state in which the load is substantially levelled, with a given height or vertical position of said head and of said rotating plates 14 and 15, in particular, at that point the process should effectively stop, even if the bin is not full. This objection is met with the possibility of adjusting the height of the filling head, on the basis of the average load already present in the bin. The relative solutions are already well known and used in the art, and for this reason they are not explained further.

The fundamental teaching illustrated above is materialized by matching, on the same vertical plane of those areas on which more produce is to be released, an opening 51 on the lower plate 15 with an opening 41 on the upper plate 14.

Figure 9:
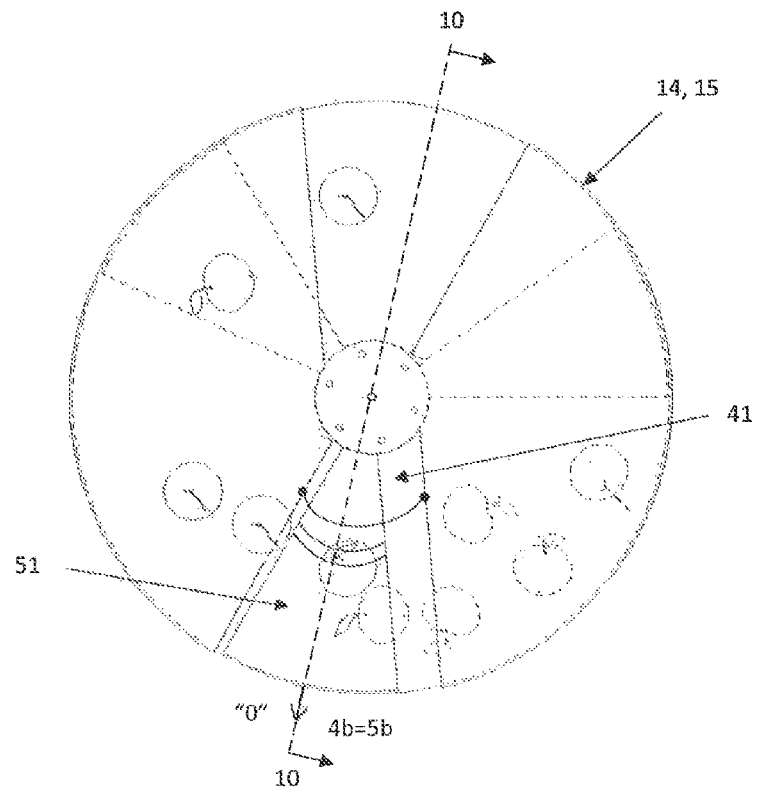
FIG. 9 illustrates a view from above and with phantom lines showing the combination of the two devices of FIGS. 6 and 7, in a second condition of operation.

In fact, when these openings are positioned on the same vertical plane "O", as shown in FIGS. 9, 10 and 10A, it is evident that they form a free passage through which the produce disposed above the upper plate 14 flows down by itself toward the bin, and exactly in the expected and previously spotted area.

At this point, it is a matter of bringing the two openings to match with each other where desired, or where it is necessary. For this purpose, and with reference to FIGS. 11, 12A and 12B, according to the invention, it will be sufficient to:

1) detect the position of two openings 41 and 51 in the respective plates;
2) calculate the respective angle of rotation 4a and 5a with respect to position "O" of the bin on which more produce is to be released;
3) and then control individually the different rotation speeds of said plates 14 and 15 so that said openings 41 and 51 cross the same vertical plane exactly at the moment when they are also on the vertical plane of said position "O".

These three operations are easily carried out by this system: in fact, as mentioned above, the system is provided with three well known means that detect the position of said openings 41 and 51 with respect to a fixed reference point; in fact, said openings obviously maintain a fixed angle with respect to the respective rotating plates, whose position is known at all times.

Similarly, the position of point "O" is sensed and transmitted by said sensors 21, 22, 23, . . . . Since the angle between the sensors and said lower plate 15 is known and constant, this data too becomes immediately known.

Figure 11:
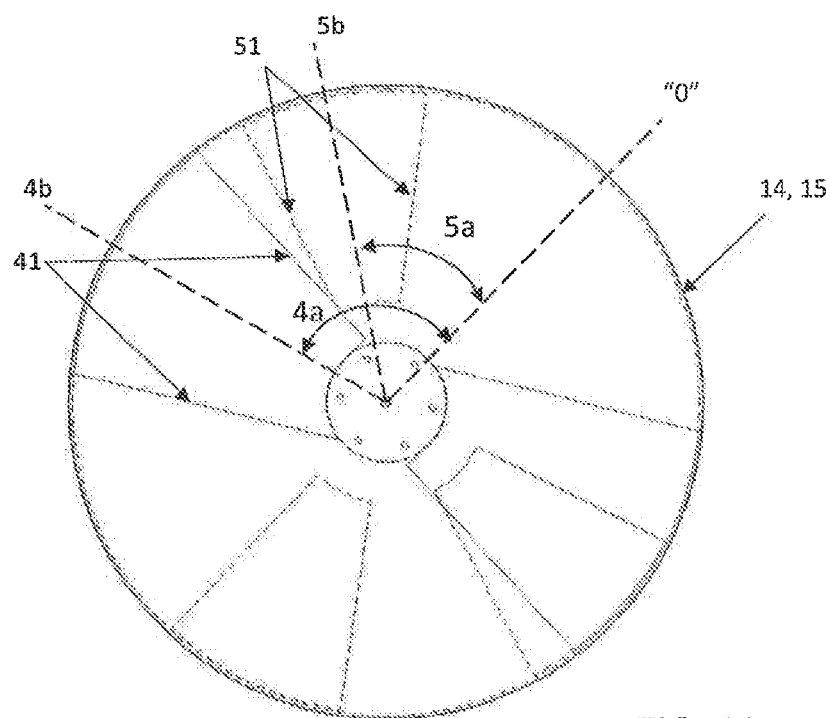
FIG. 11 shows a view similar to FIG. 8, but with some additional details that will be utilized in the description.
Figure 12A:
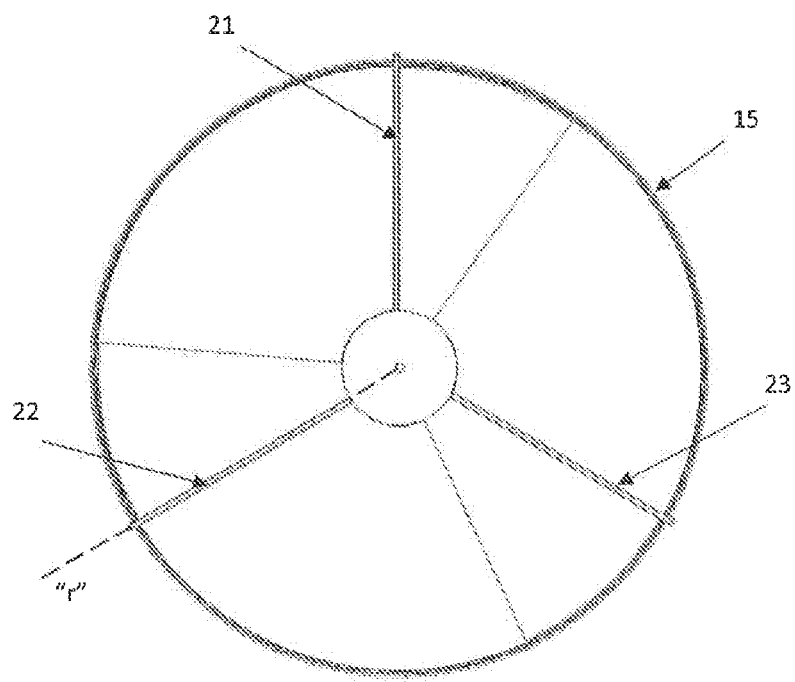
FIG. 12A illustrates a plan view from below of the lower rotating plate 15, and 12B shows the arrangement of the sensors according to the invention.

And thus, with reference to FIG. 11, if "4a" is the angle between the opening 41 of the upper plate 14 and said reference position "O", and if "5a" is the angle between the opening 51 of the lower plate 15 and the same reference position "O", then the respective angular speed "V4" and "V5" will have to be inversely proportional to the respective angular distances from said reference position "O", that is, said drive and control means will have to rotate said two plates at a different speed in order to have the equation $$(V4/V5)=(5a/4a)$$

This condition can be easily achieved with means of known type that control the rotation of said two rotating plates 14 and 15.

Thus, after a time $t=4a/V4=5a/V5$ the two openings are aligned in the position "O", as shown in FIG. 9, and the produce, no longer held back by the upper plate 14, is released exactly on said position "O" through said openings 41 and 51, exactly as desired.

Figure 6:
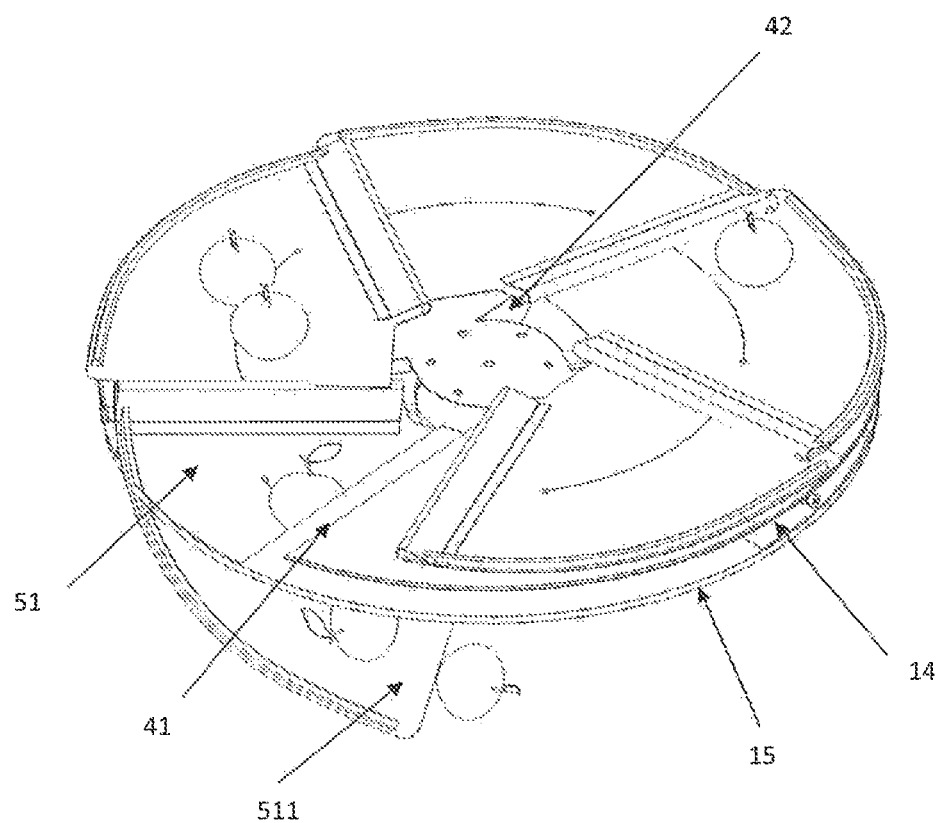
FIG. 6 shows a simplified, schematic and perspective view of some fundamental assembled devices of the rotating head according to the invention.
Figure 7:
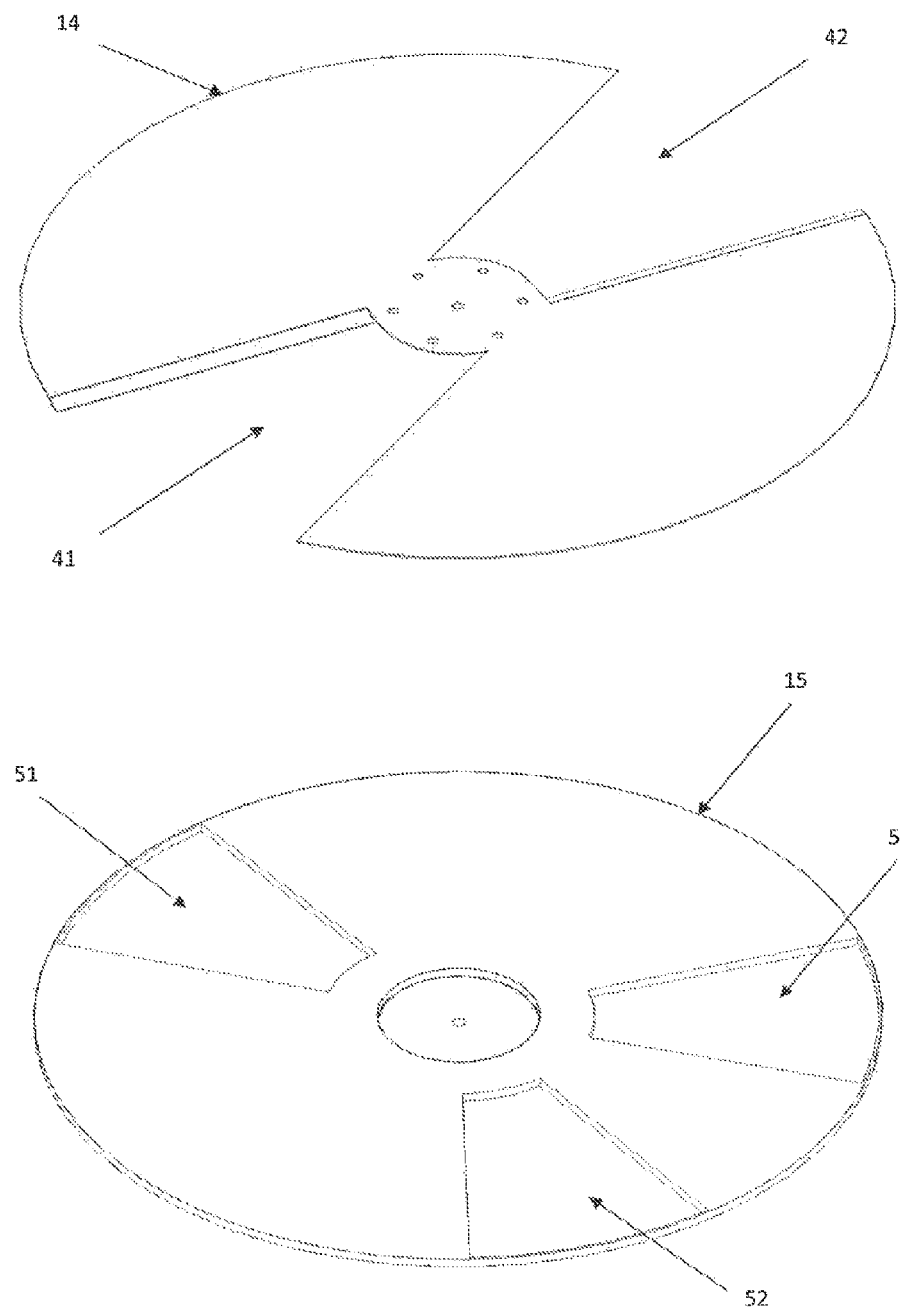
FIG. 7 shows a perspective view of the two devices of FIG. 6, shown individually.
Figure 8:
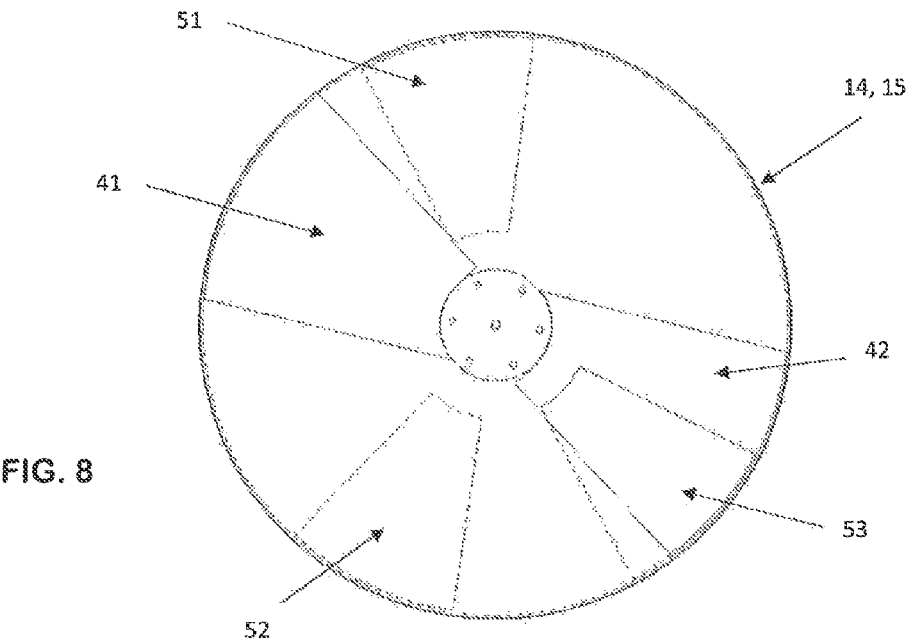
FIG. 8 illustrates a phantom view from above showing the combination of the two devices of FIGS. 6 and 7 in a first condition of operation.

Many variants and improvements will be possible at this point:

a) The first variant considers the situation in which not just one but a plurality of respective openings 41, 51, . . ., could be provided on said plates, as for example in FIGS. 6, 7 and 8. This configuration may be preferred for reasons that need not be explained here.

This variant does not, however, cause any problem because in any case, as the "target" indicated by point "O" is known, and also known is the speed of the rotating plates, as are also known the positions of the various openings in both rotating plates, the technician in the field will be able to readily calculate and control the separate speeds of the two plates so that at least the opening of a plate nearest to "O" will coincide on the vertical plane with the opening nearest to "O" of the other plate, through the procedure and the means just generally described above.

Figure 12B:
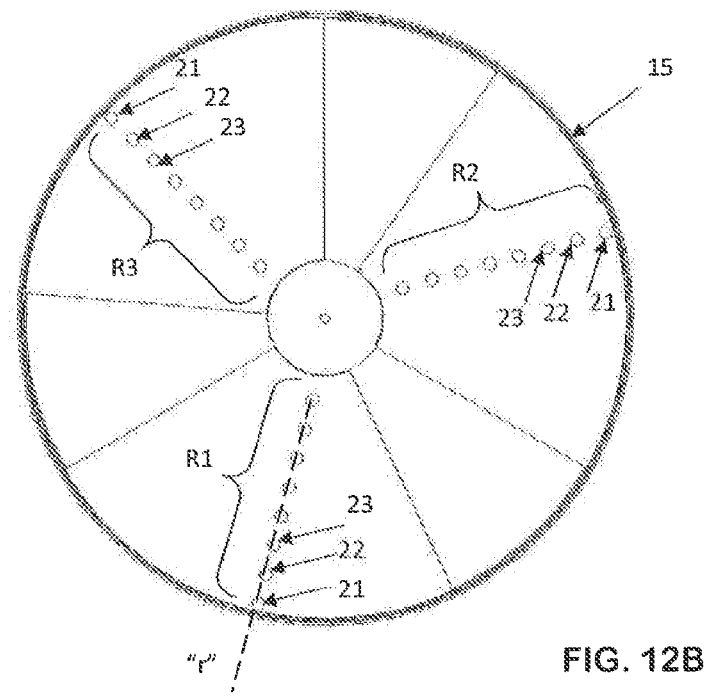

The second variant regards the arrangement of said sensors 21, 22, 23, . . . , preferably obtained with flexible combs known in the art. Although conceptually said sensors could be achieved with any other type of means and/or technology suitable to locate areas of particular heaping of produce inside the bin, it is however preferable, in order to explore the entire surface of the produce inside the bin, that the produce be arranged along a given radial rectilinear line "r", as shown in FIG. 12B, and also preferably that it be applied under the lower rotating plate 15 along a single radius "R1", or also along more radiuses "R2", "R3", wherein said radiuses can be either at angles to each other or aligned with each other, as shown in FIG. 12B.

In this manner, by suitably proportioning both the radial and the angular distribution of said flexible combs, it becomes possible to trace a sort of sufficiently precise "map" of the three-dimensional appearance of the of the surface of the load of produce placed in the bin, and consequently it becomes possible to achieve a type of filling of produce from above so as to have its optimal distribution in the bin, taking in fact into account the already existing distribution, which is practically renewed in real time.

The third variant lies in the fact that on the edges of said openings 41, 51, . . . that are turned in the direction of rotation of the respective rotating plates are arranged respective flexible flaps set at a downward angle 411, 511, . . . .

Figure 5:
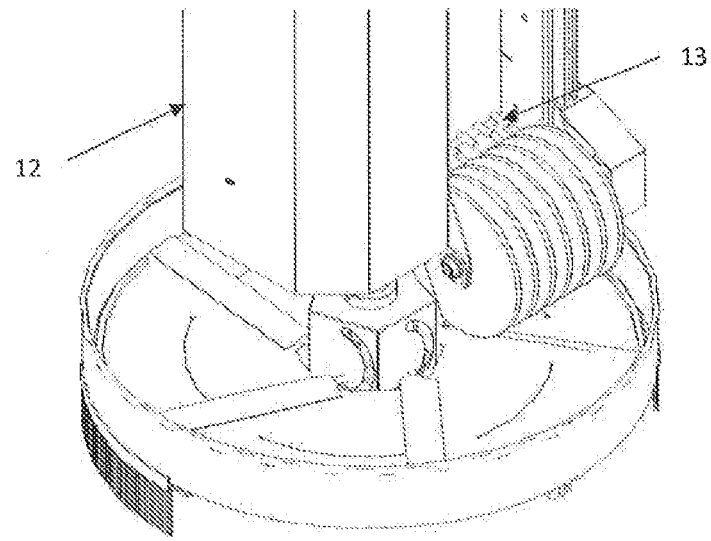
FIG. 5 shows a perspective view of the lower portion of the head of the apparatus of FIGS. 3 and 4.
Figure 5A:
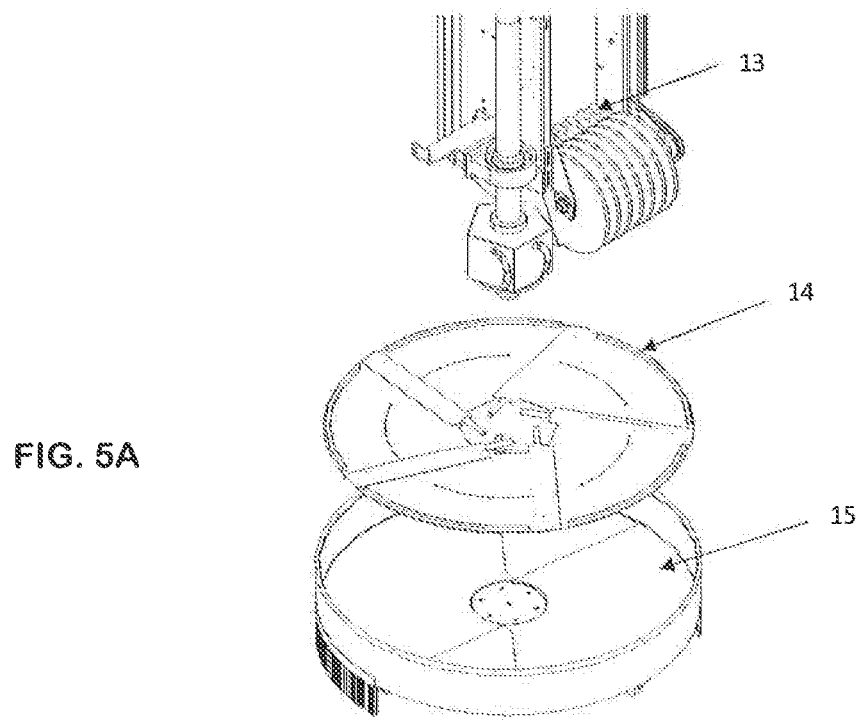
FIG. 5A shows the assembly of FIG. 5 but in an exploded view.
Figure 13A:
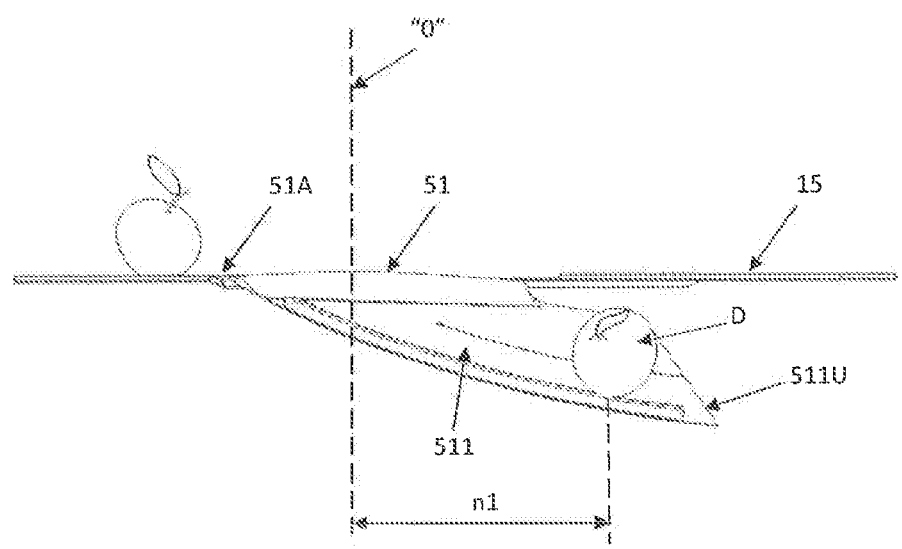
FIGS. 13A and 13B illustrate two respective enlarged views in vertical cross section, parallel to each other and generally similar to the cross-sectional plane of FIG. 10, which schematically explain respective different conditions of operation of the apparatus according to the invention.
Figure 13B:
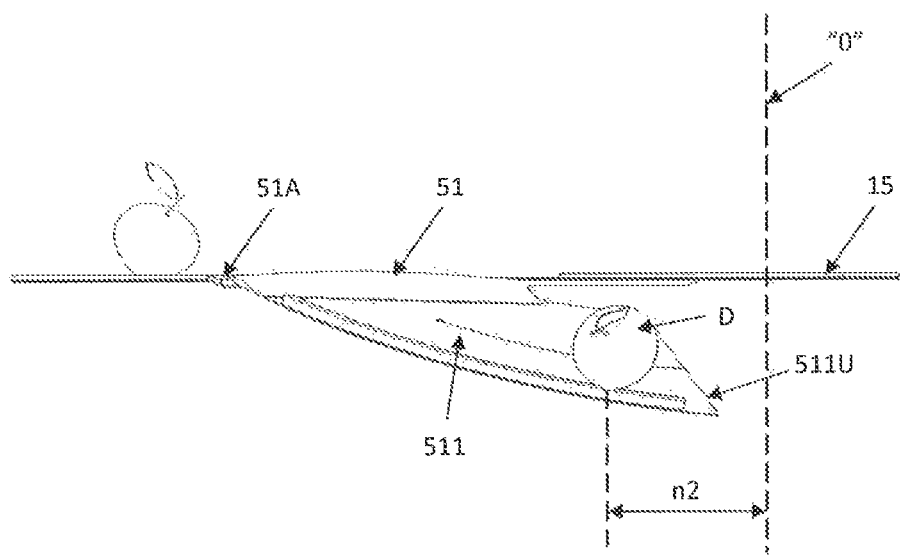

The purpose of these flaps, their nature, and their operation are well known in normally installed systems, and therefore their description is omitted for the sake of brevity; however, and with reference to FIGS. 5, 13A and 13B, it should be noted that the lower flap 511, which extends downward from the front edge 51A of the respective opening 51, effectively functions in the sense that it can delay, but also advance the dropping of the individual product "D" onto the underlying produce already heaped in the bin.

In fact, in this case the product "D" after having passed by gravity through the opening 51 of the lower plate 15, does not immediately fall down but must run on said flap 511, rolling down the flap before reaching the underling heap of produce.

Thus, it is necessary to bear this situation in mind if wishing that the produce effectively settle down in the desired position "O".

In fact, it is necessary to consider both the time taken by the product to run down the flap 511 and the time taken by the same flap 511 to slide on the bin and, for example, on said position "O" which coincides with the speed of rotation of the lower plate 51.

Thus, with reference to FIG. 13A, it will be evident that if the product "D" moves down completely from the exit edge 511U of the same flap 511 before this edge (which evidently is always late with respect to the respective opening 51) reaches the target position "O", then the relative product "D" settles down FIRST, for a distance "n1" of said target position "O", thereby partly nullifying the present invention.

If on the other hand, FIG. 13B, the product "D" rolls down completely from the exit edge 511U of the same flap after this edge (which evidently is always late with respect to the respective opening 51) reaches the target position "O", then the relative product "D" settles down AFTER, for the distance "n2", called target position "O", thus nullifying in this case too the present invention.

The best solution is found by adjusting the speeds V4 and V5 so that the factors identified above are duly measured in an experimental mode, and therefore their value is calculated in the processing of said drive and control means to determine the exact speeds of said rotating plates so that, also taking into account said flap, the product is set down exactly in the target position "O".

Figure 4:
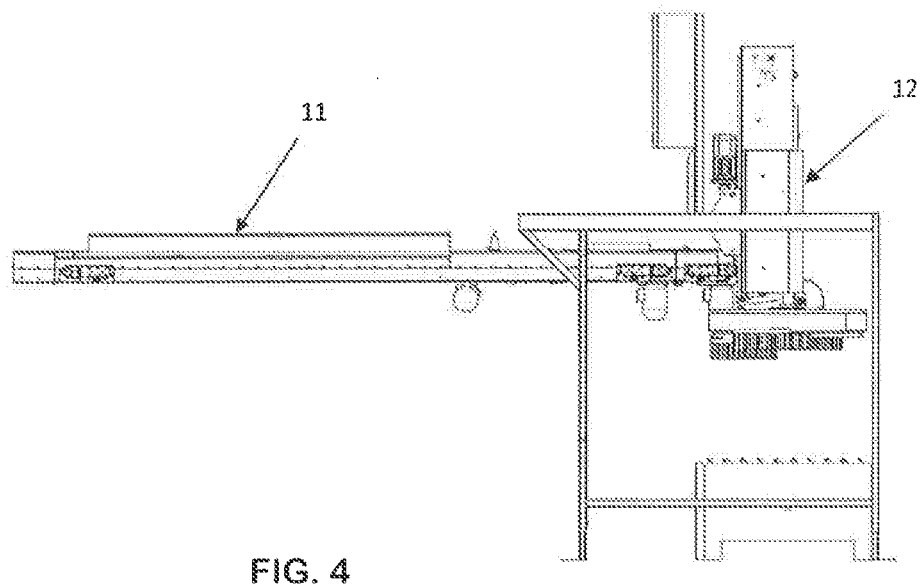
FIG. 4 shows a side horizontal view of the apparatus of FIG. 3.

A further improvement refers to the operating mode of said head; in effect, as shown in FIGS. 3 and 4, said continuous conveyor 11 is normally fed by a relative well-known produce grading machine.

The intrinsic characteristics of this grading machine make it suitable to know exactly the quantity of produce it processes in a unit of time, and therefore the instantaneous flow rate, or the average flow rate calculated at sufficiently short time intervals.

If for any reason said flow rate drops to very low values, or stops altogether, the feeding head 12 according to the known art would still continue to operate in a manner substantially independent of brief oscillations in the flow rate of said grading machine.

This leads to the serious drawback that those products that were the last to be set down and thus placed above the products already set down in the bin are "shaved" by the repeated rubbing of said flaps, which obviously continue to rotate with the relative plates; this effect has already been described above and therefore it is not described again here.

To solve this problem, the capacity of controlling selectively the rotation speed of said rotating plates 14, 15 is advantageously combined so as to also control the speed on the basis of the instantaneous or average produce feeding flow rate of said conveyor 11.

Essentially, said drive and control means are designed and conceived to adjust the rotation speed of the rotating plates, and preferably also of said vertical conveyor equipped with "fingers" 13, on the basis of a second signal representative of the flow rate measured and supplied to said conveyor 11, and preferably with a directly proportional relationship.

This operating mode also extends, naturally, to the possibility of stopping completely the rotation of said rotating plates 14, 15 when said signal representative of the flow rate of said conveyor 11 indicates that said flow is nil.

Naturally, in this case the rotation of the rotating plates starts automatically when said second signal indicates that there is a restart of effective transportation of subsequent produce.

These solutions are entirely possible and easily achievable since said drive and control means are already suitable to adjust the speed of the rotating plates, and it is perfectly within the scope of the average person skilled in the field to have this rotation speed depend not only on the signal emitted by the sensors 21, 22, 23 already mentioned, but also, and with the desired relationship, on said signal representative of the feeding rate of the produce in said conveyor 11.

The invention claimed is:

1. Apparatus for dry filling of products into open-top bins, comprising:
  a product supply device, comprising a first continuous conveyor,
  a filling head for bin filling, placed vertically above said bins, said filling head comprising:
    a second continuous conveyor for lowering products, said second continuous conveyor being movable on a substantially vertical path, and having grasping lingers for engaging said products and carrying said products with a continuous vertical motion from an upper end of the second continuous conveyor to a lower end thereof, and releasing said products by gravity, a disc arranged below said second conveyor, said disc comprising upper and lower overlying circular, coaxial rotating plates which have substantially equal diameter, are contiguous and rotate in the same direction, each rotating plate having at least one opening therein, sensors for detecting said products at a pre-defined vertical distance from the lower plate arranged below said disc, and a control unit for continuously detecting an instantaneous position of each of said two overlying plates, and selectively determining rotational speed of each of said rotating plates, wherein said sensors:

comprise respective flexible comb-like projecting members and devices to detect their inclination from vertical, rotate co-axially with the lower rotating plate, and detect the presence and/or the absence of products in defined, angled and identified areas on the upper surface of said bin, and further comprising detecting means for detecting the instantaneous position of said sensors and of transmitting said instantaneous position to said control unit.

2. Apparatus according to claim 1, wherein said control unit processes information received by said sensors and information relevant to the rotating speed and to positions of said at least one opening, and controls the angular speed of said plates so that respective ones of said openings are aligned on the same vertical line in correspondence of the information supplied by said sensors said information being relevant to the presence/absence of products and of the relevant angular position so that said products are distributed by gravity in said bin in those angular positions in which said sensors have not detected the presence of products.

3. Apparatus according to claim 2, wherein said sensors are distributed radially about the rotation axis of said rotating plates.

4. Apparatus according to claim 3, wherein said sensors are arranged with rectilinear distribution.

5. Apparatus according to claim 3, wherein said sensors are mounted on a lower surface of said lower plate.

6. Apparatus according to claim 2, wherein:

said sensors are arranged with a rectilinear radial distribution, and are split in a plurality of distinct radii with respect to the rotation axis of said rotating plates, and said distinct radii are angled to each other.

7. Apparatus according to claim 6, wherein the angle between successive radii is constant.

8. Apparatus according to claim 2, wherein each of said upper and lower plates has only one opening therein and the rat between the angular speeds of said upper and lower plates equals the ratio between angular distance of said opening of the upper plate and a common angular reference, and an angular distance of the lower plate and said common angular distance.

9. Apparatus according to claim 1, wherein a respective flap is arranged at a front edge of the opening in the lower plate, and said control unit continuously processes information relevant to the presence and size of said flaps.

10. Apparatus according to claim 9, wherein said control unit adjusts the rotation speed of each of said rotating plates in response to a further second signal representing the flow rate of the products on said first continuous conveyor.

11. Apparatus according to claim 10, wherein said control unit is adapted to stop the rotation of said rotating plates when said second signal indicates that products are not present on said first continuous conveyor, and to automatically resume rotation of said plates when said second signal indicates presence of products.

* * * * *